J. W. DAWSON.
POWER TRANSMISSION MECHANISM.
APPLICATION FILED AUG. 29, 1912.
1,116,028.
Patented Nov. 3, 1914.
2 SHEETS—SHEET 1.
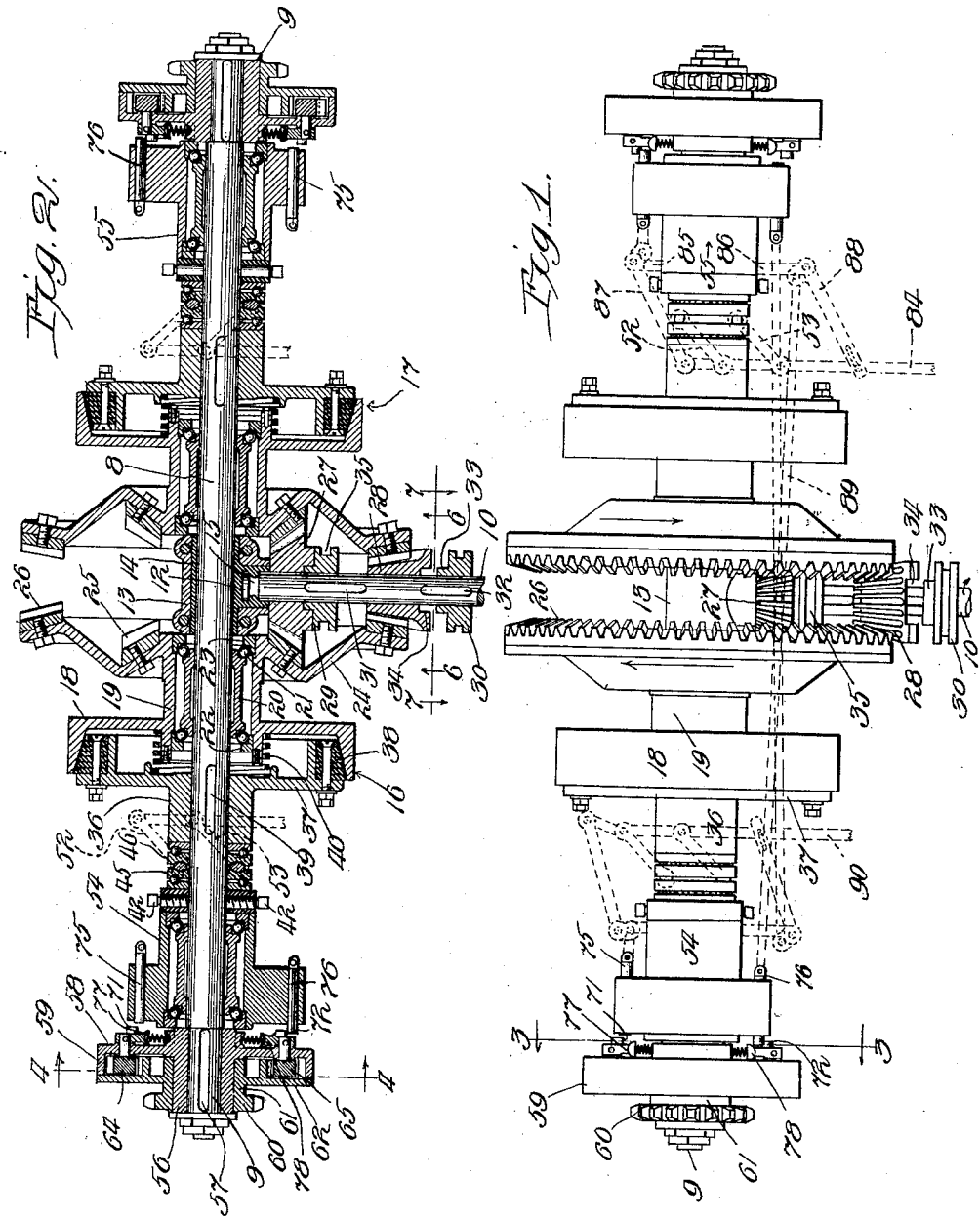
Witnesses:
Harry S. Gaither
Thomas A. Banning Jr.
Inventor:
John W. Dawson
by Banning & Banning
Attys

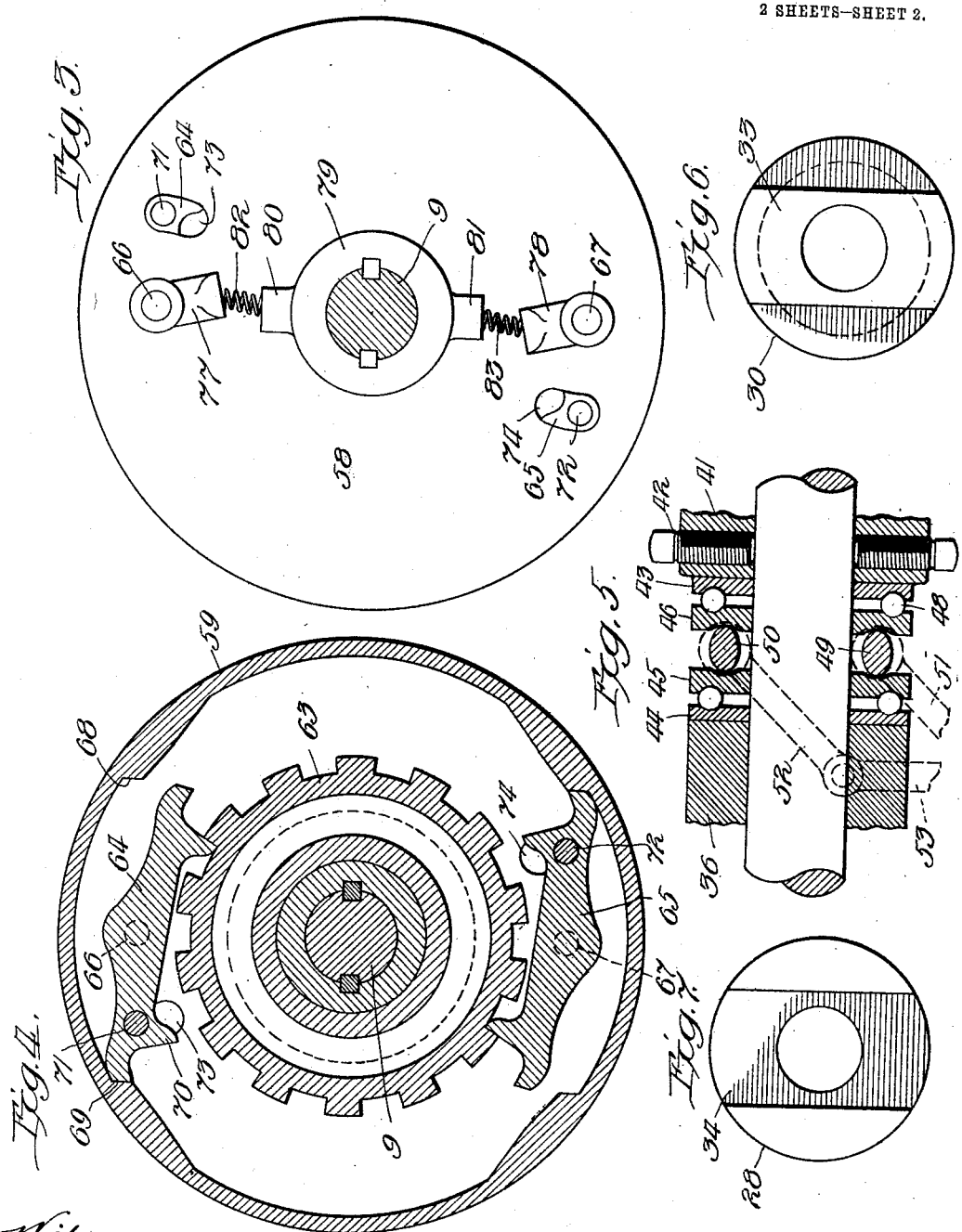

UNITED STATES PATENT OFFICE.

JOHN W. DAWSON, OF CHICAGO, ILLINOIS, ASSIGNOR OF ONE-HALF TO JOHN C. DEPEW, OF CHICAGO, ILLINOIS.

POWER-TRANSMISSION MECHANISM.

1,116,028.  Specification of Letters Patent.  Patented Nov. 3, 1914.

Application filed August 29, 1912. Serial No. 717,731.

*To all whom it may concern:*

Be it known that I, JOHN W. DAWSON, a citizen of the United States, residing at Chicago, in the county of Cook and State of Illinois, have invented certain new and useful Improvements in Power-Transmission Mechanisms, of which the following is a specification.

This invention relates to a "power transmission" or system of controlling the transmission of power from an engine to an axle or jack shaft such as is used, for example, in a motor truck. In such a case a number of prime conditions are to be met, as, for example, ability to drive at different speeds; ability to drive either forward or back on one or more speeds; differential clutching whereby each driving wheel will carry its proper load on a curve, or when the wheels are not of exactly the same diameter, etc.

The main object of the present invention is to provide a reversing mechanism which will operate entirely on the friction clutch principle, so that it will not be necessary to change gearing when changing from the forward to the reverse position, but so that these changes can be accomplished by simply releasing one clutch and throwing in another. By adopting such an arrangement the control is greatly facilitated and the dangers of not bringing the gears into clutch are removed. The importance of these improvements will be appreciated when it is considered that many accidents are the result of failure on the part of the driver to reverse his transmission gears, by reason of inability to bring them into clutch on the reverse position.

Another object of the invention is to simplify the mechanism whereby the changes of speed are effected. In the present case I have provided such a mechanism that no additional rotating elements are necessary, no matter how many additional speeds may be desired, the only change required being the addition of an annular gear to each of two rotating disks, and the addition of a single pinion to the power shaft, corresponding to each additional speed required. Moreover, by the arrangement herein adopted, the entire change-speed mechanism can be very easily incased, and thus protected from the ingress of dust, etc.

Still another object of the invention is to combine the differential mechanism directly with the main power mechanism and with the reversing and clutching levers, so that all of the parts are positively connected together, and therefore under the instantaneous control of the operator.

Other objects and uses will appear from a detailed description of the invention, which consists of the features of construction and combination of parts hereinafter described and claimed.

In the drawings: Figure 1 shows a plan view of the entire mechanism, the several link connections for operating the clutches and differential mechanisms being shown by means of dotted lines; Fig. 2 shows a horizontal section taken through the central part of the mechanism; Fig. 3 shows an enlarged detail taken on line 3—3 of Fig. 1, looking in the direction of the arrows; Fig. 4 shows an enlarged section taken on line 4—4 of Fig. 2, looking in the direction of the arrows; Fig. 5 shows an enlarged detail of the cam mechanism for throwing one of the clutches; Fig. 6 shows an enlarged detail taken on line 6—6 of Fig. 2, looking in the direction of the arrows; and Fig. 7 shows an enlarged detail taken on line 7—7 of Fig. 2, looking in the direction of the arrows.

In the several figures, I have illustrated my invention as applied to the jack shaft of an automobile truck or the like, although it will be understood that it may be usefully applied to many other purposes and conditions.

The jack shaft is designated by the numeral 8, and terminates at either end in a spindle 9, to each of which spindles the driven elements are connected, as will be presently shown.

The power shaft from the engine or other source of power is designated by the numeral 10, and preferably lies at right angles to the jack shaft, and has its inner end 12 mounted in a bearing 13 on the center of the jack shaft. This bearing is preferably split on a horizontal plane and is provided with a babbitt 14 or other similar filler. In order to retain the power shaft in accurate alinement and hold it against any possible end thrusts, it is provided with an annular groove 15 into which the babbitt seats substantially as illustrated.

At the sides of the power shaft clutches 16 and 17 are provided, each of which has a driving member 18 connected to a sleeve 19 or the like, which in turn may rotate on the jack shaft. As an efficient bearing at this point, the construction illustrated may be adopted. The same comprises a hardened metal sleeve 20 having its ends shouldered and adapted to receive balls 21. The sleeve 19 in turn carries collars 22 and 23, which engage the outer faces of the balls. By this construction, not only is the friction of rotation reduced but also a ball bearing end thrust is provided.

Each of the sleeves 19 carries a disk 24, which in turn have on their inner faces the annular gears 25 and 26 which are of different radii and are adapted to mesh with corresponding pinions of the power shaft. These pinions are designated by the numerals 27 and 28, corresponding to the annular gears 25 and 26. Means are provided for driving through any desired pinion of the power shaft to the corresponding annular gears of the disks. As a simple mechanism for accomplishing this purpose, I retain both of the pinions constantly in mesh with their respective annular gears, but only bring them into driving connection with the power shaft at such times as desired. By adopting this construction, in which the pinions are always in mesh with the annular gears, I overcome the difficulty which has hitherto existed of not always bringing the pinions into mesh with the gears. Furthermore, by this construction, the two disks are always kept in exactly the proper relative positions with respect to each other.

As a simple means of effecting the driving connections between the pinions and the power shaft, I have provided the sliding blocks 29 and 30, which are feathered to the power shaft by keys 31 and 32, so that they rotate constantly. As shown in Figs. 6 and 7, each pinion is provided with a transverse slot 33, and each of the blocks has a tongue 34 which can be brought into register with the corresponding slot. Therefore, by sliding the proper block into mesh with its corresponding pinion, a driving connection will be established. Each of the blocks is preferably provided with an annular groove 35, which may be engaged by a yoke or other device of suitable construction.

I make use of the feather keys 31 and 32 for attaining another result, namely, holding the pinions constantly in mesh with the annular gears. For this purpose each feather key abuts against the end of its corresponding pinion, as will be apparent from Fig. 2, and thus prevents the same from sliding endwise on the power shaft.

It will now be seen that the two disks are constantly driven in opposite directions, so that the jack shaft will rotate in the direction corresponding to the disk to which it is clutched. For effecting the clutch connection, I provide a sliding sleeve 36 adjacent to each of the disks 18, and each of said sleeves has a flange 37, to which is secured a cone 38 or the like of suitable friction material. When the latter is forced against its corresponding disk 18, the driving connection is established. Each of the sleeves 38 is keyed to the jack shaft by a feather 39, but is normally pushed back away from the corresponding disk 18 by means of a spring 40. Therefore, as soon as the clutching force is removed, the parts will be disengaged.

As a simple means for forcing each of the sleeves 36 along the jack shaft to effect the clutching operation, I have adopted the mechanism shown in enlarged detail in Fig. 5. The same comprises a collar 41 fixed to the jack shaft, as by means of a set screw 42, and carrying on its inner face a hardened bearing 43. A similar hardened bearing 44 abuts against the end of the sleeve, two other hardened bearings 45 and 46 being placed between the bearings 43 and 44. Balls 47 and 48 are set between the several bearings so as to reduce the friction as much as possible.

The bearings 45 and 46 preferably do not rotate, but have mounted between them the elliptically formed blocks 49 and 50. When the latter are turned into the position shown in Fig. 5, they force the sleeve 36 away from the collar 41, and thus effect the clutching operation. Lever arms 51 and 52 are connected to the elliptical blocks and to a link 53, so that by pulling down the latter into the position shown in Fig. 5, the clutching will be effected.

The mechanism thus far described serves to permit the jack shaft to be driven at any desired number of speeds, either forward or back. I will now describe the preferred differential mechanism which I have provided for taking up inequalities of the speeds of the wheels at the two ends of the shaft.

The bearing blocks on which the truck is mounted are designated by the numerals 54 and 55; each bearing block is preferably provided with a ball bearing construction similar to that previously described. A sleeve 56 is keyed to each of the spindles 9 by a key 57, said sleeve having an annular flange 58, the periphery of which extends outwardly as a cup 59; each sprocket 60 is secured to a sleeve 61, which in turn has a flange 62, which abuts against the cup of the flange 58, so as to provide therewith an inclosed box. To each of the flanges 62 is connected a toothed wheel 63, as shown more particularly in Fig. 4. A pair of dogs 64 and 65 are pivoted at the points 66 and 67 to the inner face of the flange 58, so that they can be rocked into either of two positions. Each side of the box 59 is provided with a pair of shoulders 68 and 69, against which the ends of the dog will abut for driving purposes. Each end of each dog is provided with a lug 70 adapted to engage the teeth of the wheel 63 when the dog is tilted into the proper position. The inner face of each of the lugs is formed on a slant, so that in case the teeth are traveling faster than the flange 58, as would be the case with the outer wheel traveling around a curve, said teeth will travel past the lugs of the dogs and thus permit the differential mechanism to equalize.

It is evident that in order to reverse the direction of drive it would be necessary to reverse the positions of the dogs 64 and 65. To effect this result, the dogs are provided with fingers 71 and 72 which project through slots 73 and 74 of the flange 58. Obviously, as the flange rotates, the fingers will travel with it. A pair of pins 75 and 76 are slidably mounted in each of the bearings 54 and 55. The pin 75 stands at a less distance from the center of the jack shaft than does the pin 76, and is adapted to strike the inner faces of the pins 71 and 72 as the latter travel and thus throw them outwardly. On the other hand, when the pin 76 is projected, it is adapted to strike the outer faces of the pins 71 and 72 and thus throw them inwardly toward the jack shaft, thereby reversing the positions of the dogs.

For the purpose of holding the dogs either in the one position or the other, as desired, I extend the pins 66 and 67 through the flange 58 and terminate them in the cups 77 and 78, as shown in Fig. 3. A collar 79 is secured to the axle and carries a pair of sockets 80 and 81 opposite to the cups 77 and 78 respectively, springs 82 and 83 being interposed between each cup and its corresponding socket. These springs will act as toggles to hold the dogs in either one position or the other.

Obviously, means should be provided for projecting either the pin 75 or 76, as desired, corresponding to whichever of the clutches 16 or 17 is being used. I have shown by dotted lines in Fig. 1 a series of link connections which will accomplish the aforementioned results. Assuming the power shaft to be turning over in the direction of the arrow of Fig. 1, the disks will be rotating in the directions indicated by the arrows. Therefore, the right hand clutch should be thrown in order to drive forward. On the other hand, the left hand clutch would be thrown for driving backward. By pulling on the link 84 of Fig. 1, the right hand clutch will be thrown into service. Arms 85 and 86 are extended out from each of the bearing members 54 and 55, bell cranks 87 and 88 being pivoted to the said arms. The bell crank 87 is connected to the corresponding pin 76, while the bell crank 88 is connected through the medium of a link 89 to the corresponding pin 76 on the other side of the machine. Therefore, when the clutch 17 is thrown into service, the corresponding pins 76 will be projected for throwing the dogs into the proper positions for driving forward. In like manner similar bell cranks and link connections are provided at the other side of the machine, so that when the link 90 is manipulated for throwing in the reversing clutch, the pins 75 will be brought into operation.

It will be seen that by means of the above described mechanism or its equivalent, the jack shaft can be driven either forward or back at a number of speeds, depending simply upon the number of sets of annular gears and pinions provided. Although only two of such sets are illustrated in the drawings, it is manifest that they might be added to indefinitely. Furthermore, by keeping the pinions constantly in mesh with their annular gears, and providing means for locking the pinions individually to the driving shaft, I have provided a construction in which the sets of annular gears are constantly held at a proper relative position with respect to each other. Furthermore, by means of this construction, the only friction to be overcome when the machine is standing idle will be the friction of the driving shaft in its end bearing and at the points where it passes through the pinions, because at such times it would be customary to disengage the driving shaft from the pinions.

On account of the fact that both clutches are controlled independently of the mechanism which locks the several pinions to the driving shaft, it is possible to provide means for controlling said clutches from treadles on the dash board independently of a hand lever or the like, which may be provided for controlling the change-speed mechanism. This is a great advantage over present constructions in which the reversing and change-speed mechanisms are simultaneously controlled by the same lever. For example, in order to make a quick stop and reverse, it would be necessary to simply release one clutch and throw in the other without regard to the change-speed mechanism. Such manipulation of the clutches could be instantly accomplished by means of foot treadles or the like, and without the necessity of removing the hands from the steering mechanism.

I claim:

1. In an axle drive mechanism, the combination with a pair of driving wheels, of a continuous axle extending between said wheels, a reversible overrunning connection from each end of the axle to the adjacent wheel, a pair of oppositely disposed disks independently mounted for rotation upon the axle, circular rows of driving teeth on the facing surfaces of said disks, a driving shaft extending at right angles to the axle and having its end portion lying between the disks, driving pinions on said shaft, each pinion meshing with opposite rows of teeth on the two disks, means for independently connecting each pinion to the driving shaft for driving purposes, a circular driving member connected to each disk, friction cones splined to the axle in position to independently engage said driving members, means for independently forcing said friction cones into frictional engagement with their respective driving members, means for reversing the direction of overrun of each of said overrunning connections, and a connection from each overrunning reversing means to the corresponding friction cone forcing means for the purpose of reversing the direction of overrun of each overrunning connection according to the direction of rotation of the axle.

2. In an axle drive mechanism, the combination with a pair of driving wheels, of a continuous axle extending between the said wheels, independent reversible overrunning connections for drivingly connecting the wheels to the axle, a pair of independent driving disks rotatably mounted on the axle between the overrunning connections, a driving shaft lying substantially at right angles to the axle and having its end portion extending between the disks, circular rows of gear teeth on the opposing faces of the disks, pinions on the driving shaft simultaneously meshing with opposite rows of gear teeth, means for drivingly connecting each pinion to the shaft independently of the other pinions, a driving member operatively connected to each disk, a friction cone slidably mounted on the axle adjacent to each disk, a driving connection from each of said cones to the axle, means for independently forcing said cones into driving engagement with the driving members, and means for reversing the operation of the overrunning connections corresponding to the movements of the friction cones into engagement with their respective driving members.

3. In an axle drive mechanism, the combination with a pair of driving wheels, of a continuous axle extending between said wheels, a reversible overrunning connection between each wheel and the corresponding end of the axle, means for driving the axle in either direction of rotation, and means for reversing the reversible overrunning connections with reversal of direction of axle drive.

4. In an axle drive mechanism, the combination with a pair of driving wheels, of a continuous axle extending between said wheels, a reversible overrunning connection between each wheel and the corresponding end of the axle, means for driving the central portion of the axle in either direction of rotation, and means for reversing the direction of overrun of the reversible overrunning connections according to the direction of drive of the axle.

5. In an axle drive mechanism, the combination with a pair of driving wheels, of a continuous axle extending between said wheels, means for driving that portion of the axle which is between the wheels in either direction of rotation, a reversible driving connection between each end of the axle and the corresponding driving wheel, each of said connections permitting the corresponding wheel to overrun in the direction of the drive, and means for reversing the direction of drive of said connections according to the direction of drive of the axle.

6. In an axle drive mechanism, the combination with a pair of driving wheels, of a continuous axle extending between said wheels, means for driving said axle in either direction of rotation, a reversible driving connection between each end of the axle and the corresponding wheel, each of said connections permitting the corresponding wheel to overrun with repect to the axle in the instantaneous direction of drive, and means for reversing the direction of drive of said connections according to the driving direction of the axle.

JOHN W. DAWSON.

Witnesses:
 THOMAS A. BANNING, Jr.,
 FRANCES M. FROST.